United States Patent
West et al.

(10) Patent No.: US 10,505,572 B1
(45) Date of Patent: Dec. 10, 2019

(54) ACTIVE CANCELLER FOR ELECTRONICALLY SCANNED ARRAY

(71) Applicant: Rockwell Collins, Inc., Cedar Rapids, IA (US)

(72) Inventors: James B. West, Cedar Rapids, IA (US); Ted J. Hoffmann, Palo, IA (US); Russell D. Wyse, Center Point, IA (US); Michael L. Hageman, Mount Vernon, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 94 days.

(21) Appl. No.: 15/682,624

(22) Filed: Aug. 22, 2017

(51) Int. Cl.
*H04B 1/10* (2006.01)
*H04K 3/00* (2006.01)

(52) U.S. Cl.
CPC ............ *H04B 1/1027* (2013.01); *H04K 3/28* (2013.01)

(58) Field of Classification Search
CPC .. H04B 7/0617; H04B 1/1027; H04B 1/7103; H04B 7/0413; H04B 7/086; H04B 15/00; H04B 7/0417
USPC .................................................. 375/346–349
See application file for complete search history.

(56) References Cited

U.S. PATENT DOCUMENTS

| | | | | |
|---|---|---|---|---|
| 4,780,721 A * | 10/1988 | Dobson | ................. | G01S 7/2813 342/178 |
| 6,598,014 B1 * | 7/2003 | Rabideau | ................. | G01S 3/023 342/378 |
| 2008/0012710 A1 * | 1/2008 | Sadr | ..................... | G06K 7/0008 340/572.1 |
| 2008/0151745 A1 * | 6/2008 | Rahm | ..................... | H01Q 3/26 370/221 |
| 2008/0297416 A1 * | 12/2008 | Samson, Jr. | ............ | G06F 17/16 342/377 |
| 2010/0289687 A1 * | 11/2010 | Vander Velde | ......... | F41G 7/222 342/16 |
| 2013/0094522 A1 * | 4/2013 | Moshfeghi | ............ | H04W 88/06 370/498 |
| 2013/0154880 A1 * | 6/2013 | Dickman | ................ | G01S 19/21 342/357.59 |
| 2013/0244594 A1 * | 9/2013 | Alrabadi | .............. | H04B 7/0413 455/78 |
| 2014/0226453 A1 * | 8/2014 | Harel | ................... | H04B 7/0413 370/201 |
| 2015/0381221 A1 * | 12/2015 | Cyzs | ................... | H04B 1/7097 375/346 |

* cited by examiner

*Primary Examiner* — Emmanuel Bayard
(74) *Attorney, Agent, or Firm* — Donna P. Suchy; Daniel M. Barbieri

(57) ABSTRACT

Systems and apparatuses include a sniffer circuit, a radio frequency processor, and a beamforming radio frequency integrated circuit. The sniffer circuit is structured to receive spurious signals from a sniffer antenna and self-jamming signals, and to produce an interference signal based on the spurious signals and the self-jamming signals. The radio frequency processor is structured to receive wideband signals from a plurality of radiating elements, receive the interference signals from the sniffer circuit, execute a subtraction from the wideband signals based on the interference signals, and produce desired signals. The beamforming radio frequency integrated circuit is structured to receive the desired signals from the radio frequency processor, execute beamforming operations, and produce an output signal.

18 Claims, 1 Drawing Sheet

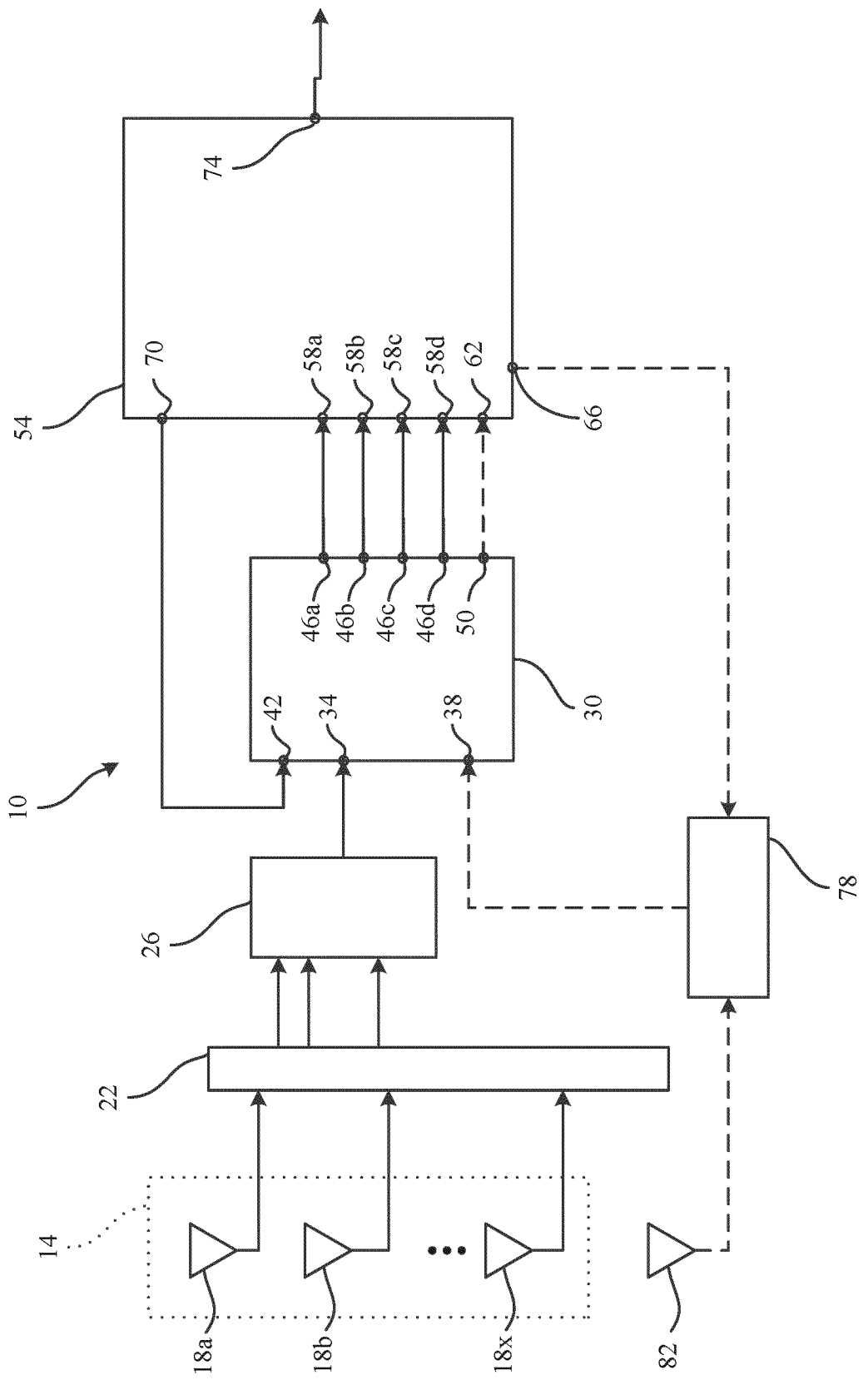

ACTIVE CANCELLER FOR ELECTRONICALLY SCANNED ARRAY

BACKGROUND

Active cancellation within antenna systems refers to the isolation or removal of interference signals received by an antenna array. Interference signals may be produced within the antenna array (e.g., a signal sent by the array and received by the array) or the signal may be produced outside the antenna array (e.g., a jamming signal sent from another antenna array).

SUMMARY

In one aspect, embodiments of the inventive concepts disclosed herein are directed to an apparatus that includes a sniffer circuit, a radio frequency processor, and a beamforming radio frequency integrated circuit. The sniffer circuit is structured to identify interference signals. The radio frequency processor is structured to receive wideband signals from a plurality of radiating elements, receive the identified interference signals from the sniffer circuit, execute a subtraction from the wideband signals based on the identified interference signals, and produce desired signals. The beamforming radio frequency integrated circuit is structured to receive the desired signals from the radio frequency processor, execute beamforming operations, and produce an output signal.

In a further aspect, embodiments of the inventive concepts disclosed herein are directed to an apparatus that includes a sniffer circuit, a radio frequency processor, and a beamforming radio frequency integrated circuit. The sniffer circuit is structured to receive spurious signals from a sniffer antenna and self-jamming signals, and to produce an interference signal based on the spurious signals and the self-jamming signals. The radio frequency processor is structured to receive wideband signals from a plurality of radiating elements, receive the interference signals from the sniffer circuit, execute a subtraction from the wideband signals based on the interference signals, and produce desired signals. The beamforming radio frequency integrated circuit is structured to receive the desired signals from the radio frequency processor, execute beamforming operations, and produce an output signal.

In a further aspect, embodiments of the inventive concepts disclosed herein are directed to an apparatus that includes a sniffer circuit, a radio frequency processor, and a beamforming radio frequency integrated circuit. The sniffer circuit is structured to receive spurious signals from a sniffer antenna. The radio frequency processor is structured to receive wideband signals from a plurality of radiating elements, receive the spurious signals from the sniffer circuit, execute a subtraction from the wideband signals based on the spurious signals, and produce desired signals. The beamforming radio frequency integrated circuit is structured to receive the desired signals from the radio frequency processor, execute beamforming operations, and produce an output signal.

BRIEF DESCRIPTION OF THE FIGURES

Exemplary embodiments will become more fully understood from the following detailed description, taken in conjunction with the accompanying drawings, wherein like reference numerals refer to like elements, and:

FIG. 1 is a schematic representation of an electronically scanned array including an active canceller according to one embodiment.

DETAILED DESCRIPTION

Following below are more detailed descriptions of various concepts related to, and implementations of, methods, apparatuses, and systems for an active cancellation system used with an active electronically scanned array. The various concepts introduced above and discussed in greater detail below may be implemented in any number of ways, as the concepts described are not limited to any particular manner of implementation. Examples of specific implementations and applications are provided primarily for illustrative purposes.

Using typical systems and architectures, active cancellation has not been realistically implemented for active electronically scanned arrays (AESA). AESAs include front-end radio frequency (RF) Transmit (Tx) and receive (Rx) functions that are distributed across hundreds or thousands of radiating elements. Some AESAs systems provide full-duplex operation including simultaneous transmit and receive (STAR) operation from a common AESA aperture. Full-duplex AESAs distributed within an AESA element lattice require high performance and miniature diplexers for each radiating element. However, full-duplex AESAs realized on printed circuit board (PCB) stripline topologies are complicated to implement, produce unacceptable signal losses and deteriorated system performance, and have limited frequency band applicability. PCB topologies are unrealistic for realizing an active cancelling system on a full-duplex AESA.

It is desirable to provide an AESA that can provide active cancellation. In some embodiments, to achieve full-duplex active cancellation, it is advantageous to isolate transmit signals from receive signals to avoid interference and jamming. Active cancellation can generally refer herein to co-site mitigation and other self-interference mitigating architectures, and to foreign or external interference or jamming signals. Some AESAs may include a co-site mitigation technique for operating within a multiple emitter or harsh EMI environment (e.g., against Mil-464 military specifications).

Referring now to FIG. 1, an electronically scanned array (ESA) 10 includes a subarray 14 with radiation elements 18a-x. In some embodiments, the subarray 14 includes four channels. In some embodiments, the subarray 14 includes hundreds or thousands of elements 18a-x. Each element 18a-x is arranged for simultaneous transmit and receive (STAR) operation. In the following description, receive beamforming paths will be described but it is to be understood that transmit beamforming paths are contemplated and utilize similar structures.

A limiter 22 (e.g., an attenuator) is structured to communicate with the radiating elements 18a-x on an element level. In some embodiments, each radiating element 18a-x is structured in communication with a limiter, and in some embodiments, a single limiter is arranged to communicate with all the radiating elements 18a-x. The limiter 22 is structured to avoid overloading of downstream circuitry when the radiating elements 18a-x are exposed to high energy signals. In some embodiments, the limiter 22 is a smart limiter that can shunt, attenuate, or limit undesirable or dangerous signals while still allowing desirable signals to pass through the limiter 22. In some embodiments, the limiter 22 is a tunable high power Z-Fab EMI suppression filter.

A filter in the form of a digitally controlled linearity filter 26 is structured to receive signals from the limiter 22 and to pass filtered signals on to a wide band active cancellation circuit in the form of a radio frequency (RF) processor 30. The RF processor 30 includes a signal input bus 34, a sniffer signal input 38, a subtraction signal input 42, four conditioned signal outputs 46a-d, and a sniffer signal output 50. The RF processor 30 is structured to receive the filtered signals from the filter 26, and to subtract signals received at the subtraction signal input 42. In some embodiments, The RF processor 30 can be realized in several RFIC technologies (e.g., SiGe for low cost, GaN for high-level cancellation, or InP for extremely high frequency operation).

A beamforming radio frequency integrated circuit (RFIC) 54 is arranged in communication with the RF processor 30 and includes four conditioned signal inputs 58a-d structured to receive conditioned signals from the conditioned signal outputs 46a-d, a filtered sniffer signal input 62 structured to receive signals from the sniffer signal output 50, a transmit signal output 66 structured to send signals indicative of self-jamming frequencies, a subtraction signal output 70 structured to send signals to the subtraction signal input 42 of the RF processor 30, and a beam output 74.

A sniffer circuit 78 is structured in communication between the transmit signal output 66 and the sniffer signal input 38 of the RF processor 30. In some embodiments, the sniffer circuit 78 is structured to identify signals that are being received or sent by the RFIC 54 and pass the identified signals through the RF processor 30. The identified signals are then received by the RFIC 54 at the filtered sniffer signal input 62 and transformed into a subtraction signal that is relayed to the RF processor at the subtraction signal input 42. In this way, a feedback loop is formed that will identify, process, and subtract self-jamming signals on an individual element level. The identified spurious signal is vector subtracted or "nulled out" of the desired signal immediately before being processed by the RFIC 54. That is, each individual radiating element 18a-x is monitored and controlled to mitigate self-jamming from adjacent radiating elements 18a-x or adjacent subarrays. In some embodiments, the sniffer circuit 78 is a high power circuit that communicates with multiple RF processors 30 and RFICs 54. A single sniffer circuit 78 communicating with multiple ESAs 10 can reduce overall system power requirements. In some embodiments, each ESA 10 includes a sniffing circuit 78.

In some embodiments, the ESA 10 includes a sniffer antenna or sniffer radiating element 82 structured to detect spurious, interfering, or unexpected signals. When the sniffer radiating element 82 is included, the sniffer circuit 78 is structured to receive spurious signals from the sniffer radiating element 82 and identified signals from the RFIC 54, and provide sniffer signals to the RF processor 30 as discussed above. The sniffer circuit 78 can provide both self-jamming and external signal jamming mitigation. In some embodiments, the sniffer circuit 78 communicates with the filter 26 and the spurious signals are first filtered before passing to the RF processor 30.

In operation, the ESA 10 receives all incoming signals via the radiating elements 18a-x. All signals are passed through the limiter 22. Conditioned signals are then sent to the filter 26 before passing to the RF processor 30. The sniffer antenna 82 can be structured to receive spurious signals and provide the spurious signals to the sniffer circuit 78. The sniffer circuit can also receive identified self-jamming signals from the RFIC 54. Identified signals and spurious signals are provided to the RF processor 30 by the sniffer circuit 78. The RFIC 54 also provides the RF processor 30 with a subtraction signal that is based on a feedback loop provided by the sniffer circuit 78. The RF processor 30 vector subtracts the signals provided by the sniffer circuit 78 from the signals received by the radiating elements 18a-x, and desired signals are sent to the RFIC 54 for beamforming and processing, and then output at beam output 74.

In some embodiments, the feedback loop provided by the sniffer circuit 78 communicates directly with the RFIC 54. In some embodiments, the limiter 22 and the filter 26 are provided on the RF processor 30. While the above discussion is directed to received signals, the active cancellation architectures also apply to transmit modes of operation.

While the detailed drawings, specific examples, and particular configurations given describe preferred and exemplary embodiments, they serve the purpose of illustration only. The inventions disclosed are not limited to the specific forms and reticles shown. For example, the methods may be performed in any of a variety of sequence of steps. The hardware and optical configurations shown and described may differ depending on the chosen performance characteristics and physical characteristics of the radar and processing devices. For example, the type of system components and their interconnections may differ. The systems and methods depicted and described are not limited to the precise details and conditions disclosed. The specific mechanical components and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus, comprising:
   a sniffer circuit structured to identify interference signals;
   a radio frequency processor structured to receive wideband signals from a plurality of radiating elements, receive the identified interference signals from the sniffer circuit, execute a subtraction from the wideband signals based on the identified interference signals, and produce desired signals; and
   a beamforming radio frequency integrated circuit structured to receive the desired signals from the radio frequency processor, execute beamforming operations, and produce an output signal,
   wherein the beamforming radio frequency integrated circuit provides a subtraction signal to the radio frequency processor, the subtraction signal being based on the identified interference signals.

2. The apparatus of claim 1, further comprising a limiter structured to attenuate signals received from the radiating elements upstream of the radio frequency processor.

3. The apparatus of claim 1, further comprising a filter structured to provide digitally controlled linearity to the wideband signals received by the radiating elements.

4. The apparatus of claim 1, wherein a self-jamming signal is provided to the sniffer circuit by the beamforming radio frequency integrated circuit.

5. The apparatus of claim 1, further comprising a sniffer antenna structured to receive spurious signals.

6. The apparatus of claim 5, wherein the identified interference signals include the spurious signals.

7. An apparatus, comprising:
a sniffer circuit structured to receive spurious signals from a sniffer antenna;
a radio frequency processor structured to receive wideband signals from a plurality of radiating elements, receive the spurious signals from the sniffer circuit, execute a subtraction from the wideband signals based on the spurious signals, and produce desired signals; and
a beamforming radio frequency integrated circuit structured to receive the desired signals from the radio frequency processor, execute beamforming operations, and produce an output signal,
wherein the sniffer circuit is also structured to receive self-jamming signals from the beamforming radio frequency integrated circuit, and
wherein the radio frequency processor is structured to execute the subtraction from the wideband signals based on the self-jamming signals.

8. The apparatus of claim 7, further comprising a limiter structured to attenuate signals received from the radiating elements upstream of the radio frequency processor.

9. The apparatus of claim 7, further comprising a filter structured to provide digitally controlled linearity to the wideband signals received by the radiating elements.

10. The apparatus of claim 7, wherein the beamforming radio frequency integrated circuit produces a subtraction signal based on the spurious signals and provides the subtraction signal to the radio frequency processor.

11. The apparatus of claim 7, wherein the sniffer circuit is structured to communicate with a plurality of beamforming radio frequency integrated circuits.

12. The apparatus of claim 7, wherein the apparatus provides simultaneous transmit and receive functionality and mitigates self-jamming and external jamming on an element level.

13. An apparatus, comprising:
a sniffer circuit structured to receive spurious signals from a sniffer antenna and self-jamming signals, and to produce an interference signal based on the spurious signals and the self-jamming signals;
a radio frequency processor structured to receive wideband signals from a plurality of radiating elements, receive the interference signal from the sniffer circuit, execute a subtraction from the wideband signals based on the interference signal, and produce desired signals; and
a beamforming radio frequency integrated circuit structured to receive the desired signals from the radio frequency processor, execute beamforming operations, and produce an output signal.

14. The apparatus of claim 13, further comprising a limiter structured to attenuate signals received from the radiating elements upstream of the radio frequency processor.

15. The apparatus of claim 13, further comprising a filter structured to provide digitally controlled linearity to the wideband signals received by the radiating elements.

16. The apparatus of claim 13, wherein the self-jamming signals are provided to the sniffer circuit by the beamforming radio frequency integrated circuit.

17. The apparatus of claim 13, wherein the beamforming radio frequency integrated circuit provides a subtraction signal to the radio frequency processor, the subtraction signal being based on the interference signal.

18. The apparatus of claim 13, wherein the apparatus provides simultaneous transmit and receive functionality and mitigates self-jamming and external jamming on an element level.

\* \* \* \* \*